United States Patent
Chiang

(10) Patent No.: US 8,693,092 B2
(45) Date of Patent: Apr. 8, 2014

(54) FOCUSING MODULE FOR LONG FOCAL LENGTH TELESCOPE

(76) Inventor: Ching-Hsi Chiang, Jhongli (TW)

(*) Notice: Subject to any disclaimer, the term of this patent is extended or adjusted under 35 U.S.C. 154(b) by 596 days.

(21) Appl. No.: 12/982,549

(22) Filed: Dec. 30, 2010

(65) Prior Publication Data

US 2011/0255158 A1 Oct. 20, 2011

(30) Foreign Application Priority Data

Apr. 16, 2010 (TW) ............................. 99111906 A

(51) Int. Cl.
*G02B 23/00* (2006.01)
(52) U.S. Cl.
USPC .......................................... 359/425; 359/399
(58) Field of Classification Search
None
See application file for complete search history.

(56) References Cited

U.S. PATENT DOCUMENTS

| | | | | |
|---|---|---|---|---|
| 3,088,370 A | * | 5/1963 | Erbe et al. | 359/823 |
| 5,303,090 A | * | 4/1994 | Burr et al. | 359/823 |
| 5,357,366 A | * | 10/1994 | Marchlenski | 359/393 |
| 6,069,754 A | * | 5/2000 | Schmidt | 359/825 |
| 6,297,917 B1 | * | 10/2001 | Burr | 359/825 |
| 2002/0114070 A1 | * | 8/2002 | Barziza | 359/430 |

* cited by examiner

*Primary Examiner* — Arnel C Lavarias
(74) *Attorney, Agent, or Firm* — Rosenberg, Klein & Lee

(57) ABSTRACT

A focusing module for long focal length telescope which includes a sliding plate, a fixing sleeve, and a fixing bolt is disclosed. The drawtube is disposed on the sliding plate for sliding forward or backward to focus. The fixing sleeve and the fixing bolt form a connecting mechanism. When screwing the fixing sleeve to clamp the sliding plate from the bottom, the fixing bolt will be driven to clamp the sliding plate from the top simultaneously. This prevents the main tube and the drawtube from being displaced, and the target can be kept in the field of view of the telescope.

10 Claims, 3 Drawing Sheets

FOCUSING MODULE FOR LONG FOCAL LENGTH TELESCOPE

FIELD OF THE INVENTION

The present invention relates to a focusing module for telescope, and more particularly to a focusing module for long focal length telescope.

BACKGROUND OF THE INVENTION

The focusing module of a telescope usually comprises a clamp screw. When people focus the telescope by sliding the drawtube to the position that gives the best image, one can screw the clamp screw to hold the drawtube in a fixed position.

For a telescope of the prior art, the drawtube will be displaced slightly when the clamp screw is screwed to clamp the drawtube. For a long focal length telescope, a slight displacement of the drawtube may cause the target out of the field of view of the telescope.

SUMMARY OF THE INVENTION

It is an objective of the present invention to provide a focusing module for telescope, and more particularly to a focusing module for long focal length telescope.

It is another objective of the present invention to provide a focusing module for long focal length telescope comprising a plurality of bearings for clipping a sliding plate, wherein the drawtube is disposed on the sliding plate for focusing.

It is another objective of the present invention to provide a focusing module for long focal length telescope comprising a fixing bolt and a fixing sleeve for clamping the sliding plate from the both sides simultaneously and preventing the drawtube from being displaced.

It is another objective of the present invention to provide a focusing module for long focal length telescope, wherein the fixing sleeve comprises a hollow portion and a thread, and is screwed from the bottom of the base to jostle against the sliding plate.

It is another objective of the present invention to provide a focusing module for long focal length telescope, wherein the fixing bolt comprises a head and a thread, and is put into the hollow portion of the fixing sleeve from the top of the sliding plate, wherein the fixing bolt is fixed with the fixing sleeve by a fixing nut. Because of the connecting mechanism, the fixing sleeve and the head of the fixing bolt will simultaneously clamp or release the sliding plate from the both sides when people screw the fixing sleeve.

The present invention provides a focusing module for long focal length telescope, comprising: a base having a fixing screw hole; a sliding plate disposed on the base and having a long hole, wherein a drawtube of the long focal length telescope is disposed on the sliding plate; a plurality of bearings disposed on the base for clipping the sliding plate; at least one focusing knob disposed at the lateral side of the base for driving the sliding plate to slide forward or backward; a fixing sleeve having a hollow portion and a thread, wherein the fixing sleeve is screwed from the bottom of the base through the fixing screw hole to jostle against the sliding plate; and a fixing bolt having a head and a thread, wherein the fixing bolt is put through the long hole into the hollow portion of the fixing sleeve and is screwed tight with a fixing nut, wherein the fixing nut is then fixed with the fixing sleeve.

DETAILED DESCRIPTION OF DISCLOSED EMBODIMENTS

Figure 1:
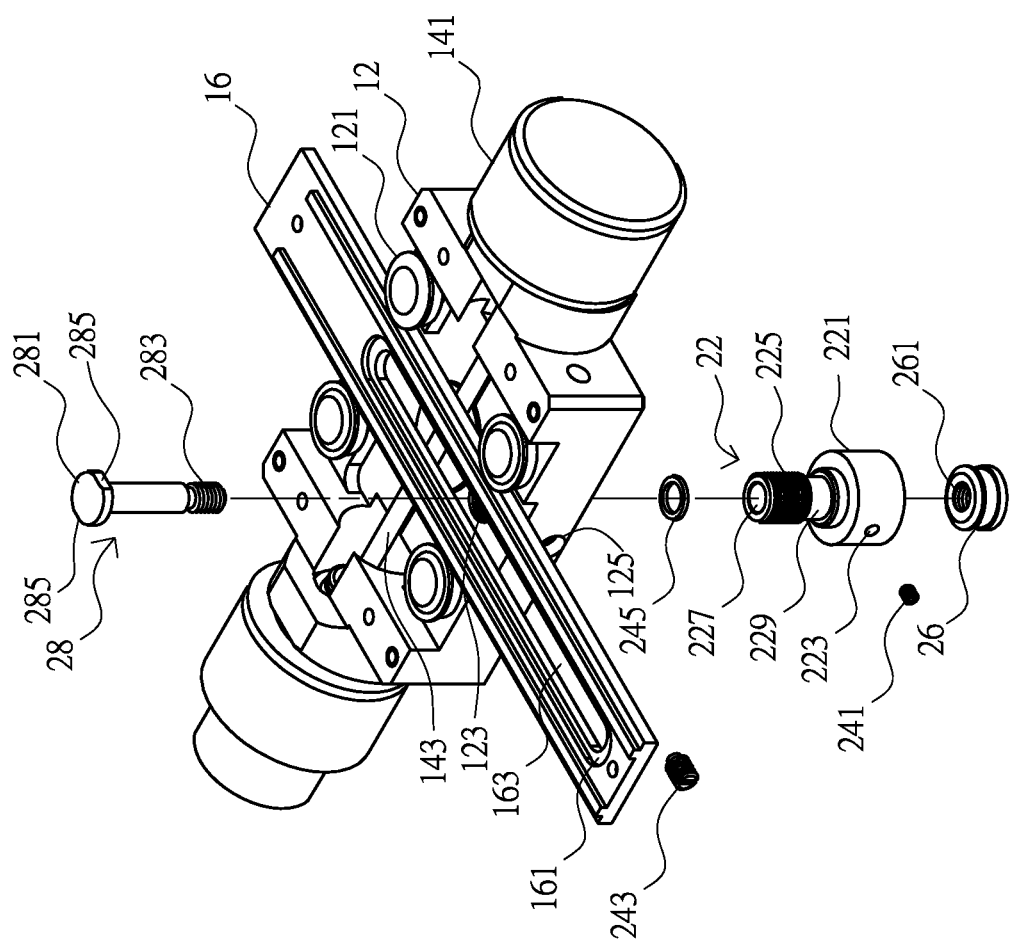
FIG. 1 is an explosion diagram of a focusing module for long focal length telescope in accordance with one embodiment of the present invention.
Figure 2:
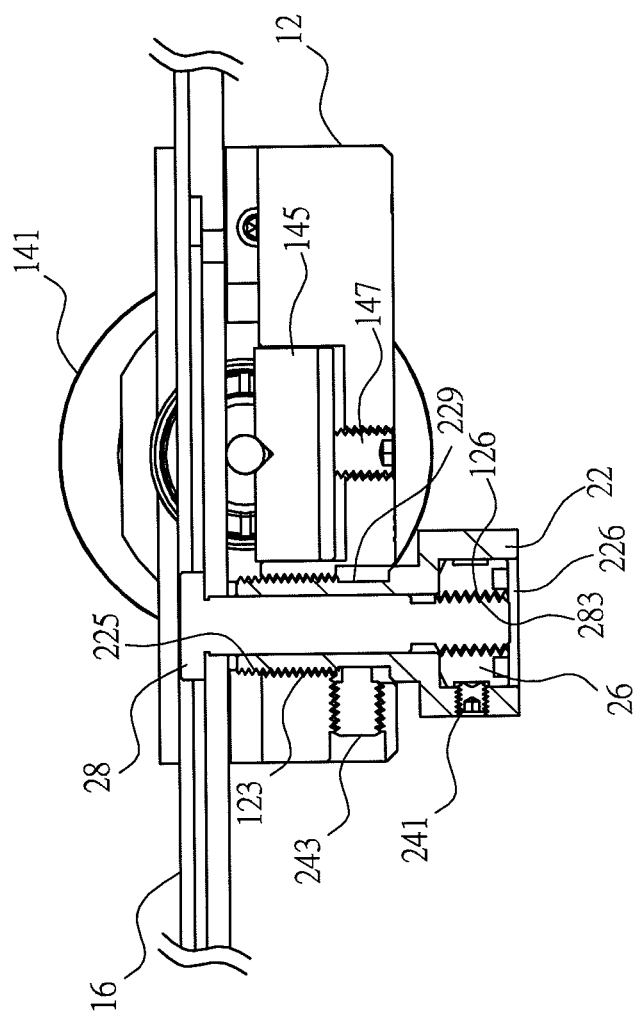
FIG. 2 is a cross-sectional view of the focusing module for long focal length telescope in accordance with the embodiment of the present invention shown in FIG. 1.

Referring to FIG. 1 and FIG. 2, there are shown an explosion diagram and a cross-sectional view of a focusing module for long focal length telescope in accordance with one embodiment of the present invention. The focusing module for long focal length telescope of the present invention comprises a base 12, a focusing knob 141, a sliding plate 16, a fixing sleeve 22, and a fixing bolt 28.

A plurality of bearings 121 are disposed on the base 12 for clipping the sliding plate 16. Such that, the sliding plate 16 can slide smoothly on the base 12. The drawtube of the long focal length telescope is disposed on the sliding plate 16. By moving the sliding plate 16, the drawtube is driven to move inward or outward for focusing.

At least one focusing knob 141 is disposed at the lateral side of the base 12. A shaft 143 is disposed under the sliding plate 16 and connected with the focusing knob 141. When rotating the focusing knob 141, the sliding plate 16 will be driven by the friction with the shaft 143 to slide forward or backward, and the drawtube is driven by the sliding plate 16 to move for focusing.

The fixing sleeve 22 comprises a hollow portion 227, a thread 225, and a knob 221. The fixing sleeve 22 is screwed from the bottom of the base 12 through a fixing screw hole 123 to jostle against the sliding plate 16.

The fixing bolt 28 comprises a head 281 and a thread 283. The sliding plate 16 comprises a long hole 163. The fixing bolt 28 is put through the long hole 163 into the hollow portion 227 of the fixing sleeve 22. A fixing nut 26 is screwed onto the fixing bolt 28 and is fixed with the fixing sleeve 22 forming a connecting mechanism. When rotating the knob 221 to screw the fixing sleeve 22 upward, the fixing bolt 28 is pulled downward by the fixing nut 261. Such that, the head 28 of the fixing bolt 28 and the fixing sleeve 22 can clamp the sliding plate 16 simultaneously from the top and the bottom to prevent the sliding plate 16 from being displaced.

In one embodiment of the present invention, there can be formed a chamber 226 in the knob 221 of the fixing sleeve 22, and a screw hole 223 is disposed at the sidewall of the chamber 226. The fixing nut 26 can be contained in the chamber 226, and is fixed with the fixing sleeve 22 by screwing a screw 241 into the screw hole 223.

In one embodiment of the present invention, the fixing sleeve 22 further comprises a limiting groove 229 between the knob 221 and the thread 225, and the base 12 comprises a limiting screw hole 125 at the lateral side according to the position of the limiting groove 229. By screwing a limiting screw 243 through the limiting screw hole 125 into the limiting groove 229, the moving range of the fixing sleeve 22 is limited. This prevents the fixing sleeve 22 from moving out of the base 12.

The diameter of body of the fixing bolt 28 is smaller than the width of the long hole 163, and the width of the head 281 is larger than the width of the long hole 163. Such that, the head 281 of the fixing bolt 28 and the fixing sleeve 22 can clamp the sliding plate 16 from the both side.

The head 281 of the fixing bolt 28 comprises at least one matching surface 285, and the sliding plate 16 comprises a containing groove 161 around the long hole 163. The width of the containing groove 161 is smaller than the width of the head 281, and the matching surface 285 touches the sidewall of the containing groove 161 movably, that prevents the fixing bolt 28 from rotating with the fixing sleeve 22.

In one embodiment of the present invention, the pitch of the thread 225 is different from the pitch of the thread 283. Assume that the pitch of the thread 225 is 0.7 mm, and the pitch of the thread 283 is 1.0 mm. The assembly of the focusing module of the present invention comprises the steps of followings. Firstly, screw the fixing sleeve 22 from the bottom of the base 12 into the fixing screw hole 123 to jostle against the sliding plate 16. Put the fixing bolt 28 from the top of the sliding plate 16 into hollow portion 227 of the fixing sleeve 22. Screw the fixing nut 26 onto the fixing bolt 28 tightly. And then, screw the screw 241 into the screw hole 223 and fix the fixing nut 26 with the fixing sleeve 22.

When the assembly is completed, the sliding plate 16 is clamped. Since the pitch of the thread 225 is 0.3 mm less than the pitch of the thread 283, when the fixing sleeve 22 is screwed down 1 mm to release the sliding plate 16, the fixing bolt 28 will be raised for 0.3 mm. The smaller the difference between the pitches of the thread 225 and 283 is, the less space is needed between the sliding plate 16 and the drawtube. Furthermore, when screwing the fixing sleeve 22 to clamp the sliding plate 16, the difference between the pitches of the thread 225 and 283 will cause the structure to engage in a locked status.

In one embodiment of the present invention, the focusing module 10 further comprises a driving block 145 and a driving screw 147. The driving block 145 is disposed under the shaft 143. The driving screw 147 is screwed to jostle against the driving block 145 from the bottom of the base 12. By screwing the driving screw 147, the friction between the shaft 143 and the sliding plate 16 can be adjusted. Furthermore, a washer 245 can be disposed between the sliding plate 16 and the fixing sleeve 22 for preventing the sliding plate 16 from being abraded.

Figure 3:
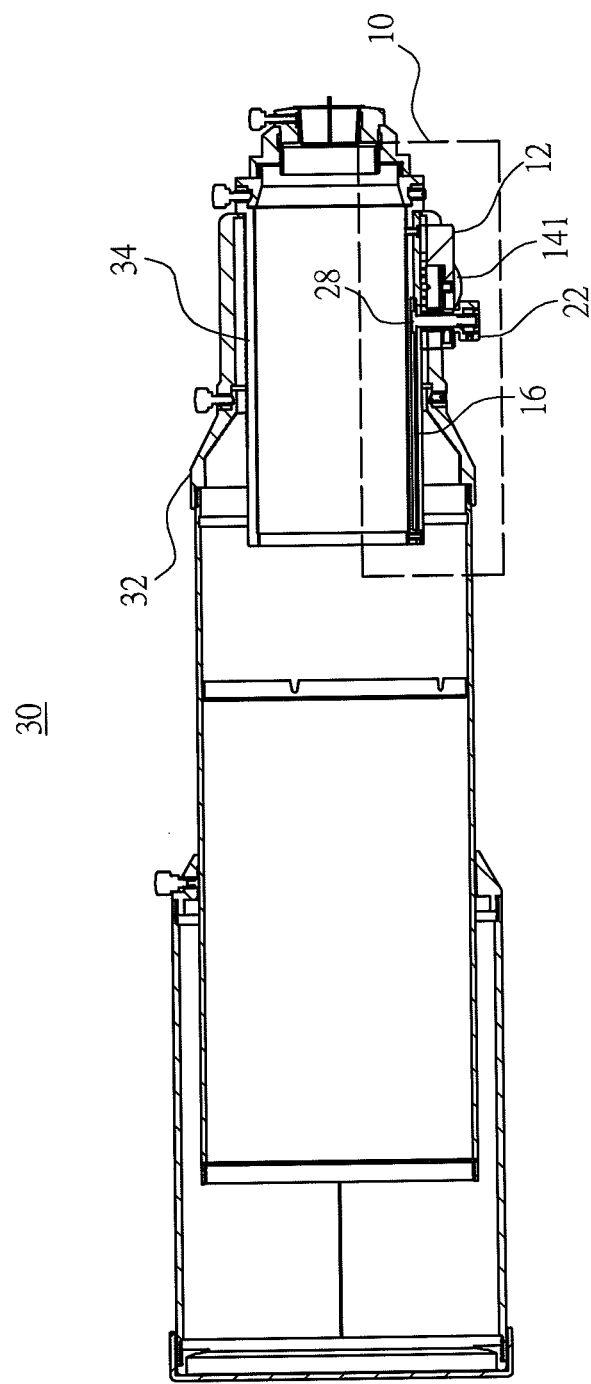
FIG. 3 is a cross-sectional view of a long focal length telescope with the focusing module in accordance with the embodiment of the present invention shown in FIG. 1.

Referring to FIG. 3, there is shown a cross-sectional view of a long focal length telescope with the focusing module in accordance with the embodiment of the present invention shown in FIG. 1. For assembling the focusing module 10 of the present invention to a long focal length telescope 30, the main tube 32 is disposed on the base 12, and the drawtube 34 is disposed on the sliding plate 16.

By rotating the focusing knob 141, the sliding plate 16 and the drawtube 34 are driven by the shaft 143 to move forward or backward for focusing. When the best image is obtained, one can screw the fixing sleeve 22 inward, and the fixing bolt 28 will be driven to clamp the sliding plate 16 with the fixing sleeve 22 from the both sides simultaneously. This prevents the drawtube 34 and the main tube 32 from being displaced, and the target can be kept in the field of view of the long focal length telescope 30.

The present invention is not limited to the above-described embodiments. Various alternatives, modifications and equivalents may be used. Therefore, the above embodiments should not be taken as limiting the scope of the invention, which is defined by the appending claims.

What is claimed is:

1. A focusing module for long focal length telescope, comprising:
    a base having a fixing screw hole;
    a sliding plate disposed on the base and having a long hole, wherein a drawtube of the long focal length telescope is disposed on the sliding plate;
    a plurality of bearings disposed on the base for clipping the sliding plate;
    at least one focusing knob disposed at a lateral side of the base for driving the sliding plate to slide forward or backward;
    a fixing sleeve having a hollow portion and a thread, wherein the fixing sleeve is screwed from a bottom of the base through the fixing screw hole to jostle against the sliding plate; and
    a fixing bolt having a head and a thread, wherein the fixing bolt is put through the long hole into the hollow portion of the fixing sleeve and is screwed tight with a fixing nut, wherein the fixing nut is then fixed with the fixing sleeve.

2. The focusing module for long focal length telescope of claim 1, wherein the fixing sleeve comprises a knob, and a chamber is formed in the knob for containing the fixing nut.

3. The focusing module for long focal length telescope of claim 2, wherein a screw hole is disposed at the sidewall of the chamber for screwing a screw to fix the fixing nut with the fixing sleeve.

4. The focusing module for long focal length telescope of claim 1, further comprising a washer disposed between the fixing sleeve and the sliding plate.

5. The focusing module for long focal length telescope of claim 1, wherein the sliding plate comprises a containing groove around the long hole, the head of the fixing bolt comprises at least one matching surface, wherein the head of the fixing bolt is contained in the containing groove, and the matching surface touches the sidewall of the containing groove movably.

6. The focusing module for long focal length telescope of claim 2, wherein the fixing sleeve comprises a limiting groove between the thread and the knob, and the base comprises a limiting screw hole at the lateral side positioned to correspond to a position of the limiting groove, wherein a limiting screw is screwed through the limiting screw hole into the limiting groove for limiting a range of motion of the fixing sleeve.

7. The focusing module for long focal length telescope of claim 1, wherein a pitch of the thread of the fixing sleeve is different from a pitch of the thread of the fixing bolt.

8. The focusing module for long focal length telescope of claim 7, wherein the pitch of the thread of the fixing sleeve is slightly smaller than the pitch of the thread of the fixing bolt.

9. The focusing module for long focal length telescope of claim 1, further comprising a shaft disposed under the sliding plate and connected with the focusing knob, wherein the sliding plate is driven by friction with the shaft to slide forward or backward.

10. The focusing module for long focal length telescope of claim 9, further comprising:
    a driving block for bearing the shaft; and
    a driving screw being screwed to jostle against the driving block from the bottom of the base for adjusting the friction between the shaft and the sliding plate.

* * * * *